United States Patent
Masciarelli, Jr.

[11] Patent Number: 6,164,429
[45] Date of Patent: Dec. 26, 2000

[54] MODULAR PNEUMATIC POP-UP UNITS FOR CONVEYOR SYSTEM

[76] Inventor: Camillo Masciarelli, Jr., 415 Berlin Rd., Marlborough, Mass. 01752

[21] Appl. No.: 09/174,390

[22] Filed: Oct. 14, 1998

[51] Int. Cl.[7] .................................................. B65G 13/00
[52] U.S. Cl. ................................ 198/35 SS; 198/35 MD
[58] Field of Search ................................. 193/35, 35 SS, 193/35 A, 35 MD

[56] References Cited

U.S. PATENT DOCUMENTS

| | | |
|---|---|---|
| 2,671,242 | 3/1954 | Lewis . |
| 4,036,345 | 7/1977 | Webb .................................. 193/35 SS |
| 4,108,455 | 8/1978 | James . |
| 4,382,637 | 5/1983 | Blackburn et al. . |
| 4,459,909 | 7/1984 | Takagi . |
| 4,553,795 | 11/1985 | Takagi . |
| 4,627,526 | 12/1986 | Masciarelli . |
| 4,660,994 | 4/1987 | Masciarelli . |
| 4,706,793 | 11/1987 | Masciarelli . |
| 4,787,808 | 11/1988 | Shimoji et al. ...................... 193/35 A |
| 5,409,096 | 4/1995 | Clopton ................................ 193/35 A |
| 5,915,515 | 6/1999 | Blair ..................................... 193/35 SS |

*Primary Examiner*—Jospeh E. Valenza
*Assistant Examiner*—Mark A. Deuble
*Attorney, Agent, or Firm*—Kriegsman & Kriegsman

[57] ABSTRACT

A pneumatic pop-up unit having an open-topped housing and a piston slidably received therein, the piston accommodating a contact element at least partially extending above the open top of the piston and a seal attached to the outside surface of the wall of the piston about the circumference thereof, configured and arranged to form a substantially air-tight seal with the inside surface of the side wall of the housing, wherein the bottom wall of the piston, and the seal form a sealed volume with the bottom wall and side wall of the housing, a cap attached to the open top of the housing, the cap having a flange and a central opening having a descending guide channel sized to slidably receive the outside surface of the side wall of the piston, wherein the cap is secured about its circumference to the side wall of the housing at the open end thereof by a single-seam crimped, rolled, coined, spun or swaged joint. Gas under pressure can be admitted to the sealed volume to elevate and suspend the piston such that the contact element is partially extended above the flange of the cap.

13 Claims, 2 Drawing Sheets

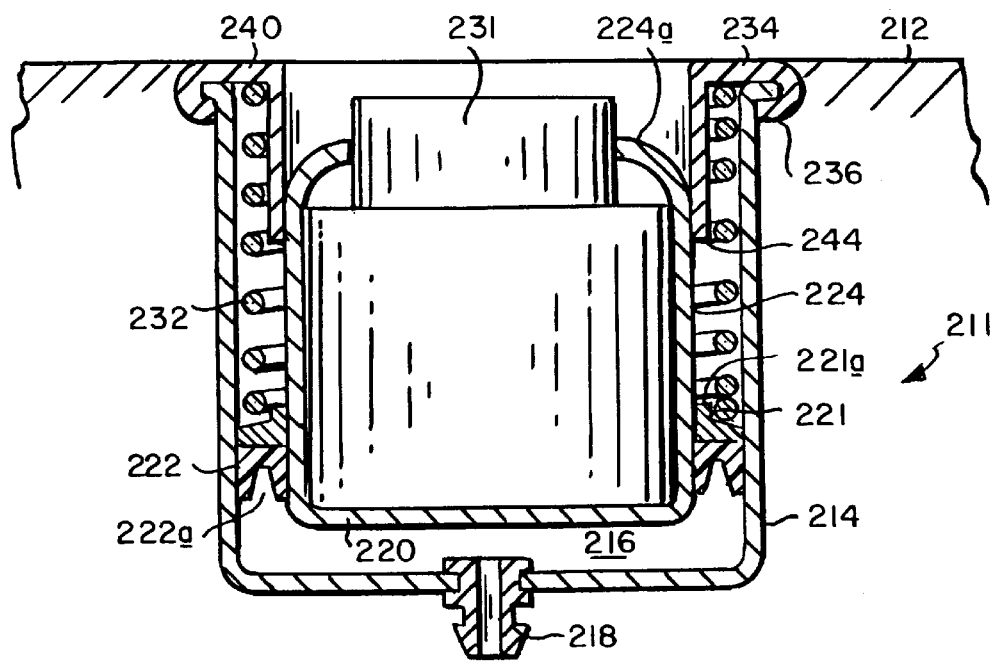
FIG. 3
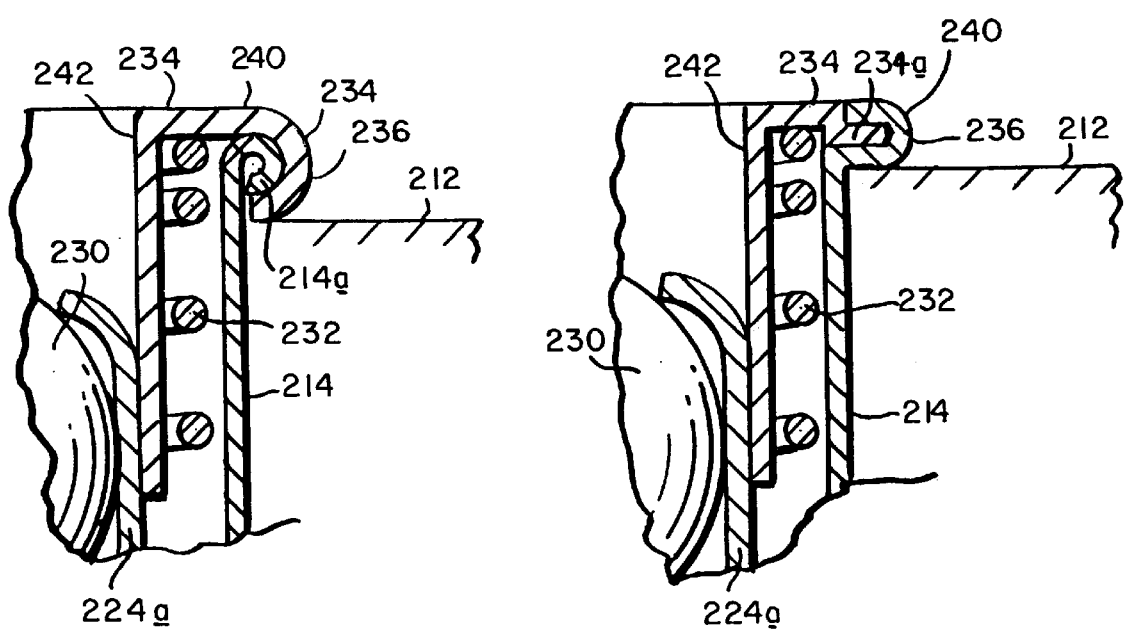
FIG. 4
FIG. 5

MODULAR PNEUMATIC POP-UP UNITS FOR CONVEYOR SYSTEM

BACKGROUND OF THE INVENTION

1. Field of the Invention

The present invention relates to material handling in general, and specifically to conveyor systems, and still more specifically to pneumatically operated anti-friction pop-up ball transfers and anti-skid plunger pads.

2. Background

Roller-type and belt conveyors are based on a design where the load conveyed travels in an essentially linear manner. Conventional conveyors utilize rollers or skate wheels, where the direction of transit on the conveyor is perpendicular to the axes of rotation of the rollers. Other conveyors utilize belts, which are driven by rollers at either end. Roller conveyors may be powered, gravity feed, or passive, where a person can manually move the load to be conveyed. Belt conveyors are usually powered. Conventional conveyors are adequate in most cases from a material-handling standpoint, for example when the conveyed load is being simply transferred from one point to another, or where the load does not need to be reoriented, repositioned or transferred from the conveyor.

Roller-type and belt conveyors, due to their linear-transit design, have shortcomings where a load needs to be reoriented, held stationary, or taken out of the conveyance stream. An example is where the conveyor connects multiple stations of an assembly area. A single roller-type or belt conveyor can be used to bring work-in-process to multiple work benches, each bench responsible for similar or different processing. Another example is where the work-in-process needs to be worked on while situated on a roller-type conveyor, where it is difficult to hold the work-in-process stationary on the rollers. In such cases, ball transfers and/or anti-skid plungers have been successfully used to provide a means for easily maneuvering loads, or holding them steady for processing. Ball transfers and plunger pads have been used to convert a simple conveyor into a progressive assembly line.

The operation of the ball transfer is relatively simple. The transfers are essentially a series of primary ball bearings that are individually supported by a manifold that is positioned along a conveyor path. When integrated with a conveyor track, the ball transfer units are typically arranged in a strip or a supporting plate which is secured across the side rails of a conveyor track. In a roller-type conveyor, the primary ball of the transfers can be in a retracted position within their housings, such that the balls do not extend above the rollers of the conveyor. When extended, the balls rise to a plane above the rollers, such that any load located over the ball transfer is now resting on the balls, above the conveyor rollers. The load may then be freely moved about in two dimensions, allowing it to be reoriented, aligned, or diverted to a track, bench or cart branching off the main conveyor, etc. Ball transfers are also used with belt conveyors, for example where plural belts driven by a single end roller are joined at their endpoint by pop-up transfers. Plungers are employed in a similar manner, for use in stably elevating a load.

Pop-up ball transfers and anti-skid plungers are not limited to use within a conveyor path or track. The transfers may be recess-mounted into a flush work surface, such as a table or bench top, such that a load may be maneuvered into a desired position when the balls are extended. Lowering the balls into the recesses then brings the load into stable contact with the table or bench top for processing, inspection, storage, and the like. Anti-skid pop-up plungers can also be used to stably hold the work while processing is performed, for example as a companion to fixed balls and/or rollers mounted on a work surface, or in a roller or skate-wheel style or belt type conveyor.

Pop-up ball transfers in particular have also been mounted on or recessed into the surfaces of mobile or stationary scissor-lifts, transfer carts, utility carts, etc. With the balls extended, a load may be maneuvered onto the cart from an adjoining conveyor or ball transfer module. When the balls are retracted into the surface, the load may be safely and stably transported. Similarly, anti-skid pop-up plungers can also be used to stably hold the work while processing is performed, or for elevating a load in a stable fashion above fixed balls or skate wheels mounted in the surface of the cart. Pop-up plungers can also be used as a companion to pop-up ball transfers.

The potential uses for pop-up ball transfers and anti-skid plungers are, as can be seen, very numerous. Because the number of possible arrangements of material handling and conveyor systems is virtually infinite, all the possible uses for ball transfer and anti-skid plunger stations, carts, benches, tables, inclines, etc., are impossible to catalog here.

A single prior art ball transfer unit 100, as described in U.S. Pat. No. 4,732,490, the contents of which are incorporated herein by reference, is depicted in FIG. 1. In use, this unit would be "ganged" with other ball transfer units arranged in a strip or array. The anti-friction element comprises a main body 101, having a tubular portion 113 with a small first bore 102 entering from a top surface 103. The main body consists of a tubular portion 114 with a second bore 104 extending through it. This tubular portion is closed at one end by the top wall 111 and closed at the other end by a bottom wall 112. The top wall has the first bore 102 extending through it and opening on its outer surface 103. The top wall has an integral tubular portion 113 extending from its inner surface having a bore which is an extension of the small bore 102. A piston 105 is slidable in the large bore 104 and has a cylindrical stem 106 which is slidable in the small bore 102. A primary ball 107 is rotatably mounted in the stem 106 concentrically of the small bore and resides in a cavity 108 formed in the stem. A coil spring 110 extends between the end of the tubular portion 113 of the top wall and a facing surface of the piston 105. A connector 109 is provided for introducing pressure air into the main body between the bottom wall 112 and the piston 105 to move the piston, so that the ball protrudes out of the small bore.

The piston 105 and the stem 106 are integral and the stem and the piston have the same cylindrical outer surface. The piston has two spaced radial flanges 119 and 120 between which lies a U-type seal 121 whose flexible element engages the surface of the second bore 104.

One disadvantage with the prior art design is that the tubular portion 113, after many cycles of pressurization of the transfer, may become loosened from the main body 101. Under pressure or a gas admitted through the connector 109 or under force from the spring 110, the piston and/or the tubular portion 113 may be forcefully ejected from the main body 101, causing injury or damage to inventory.

A further disadvantage with the prior art design is that the machining of the piston 105 with flanges 119 and 120 to receive the seal 121 is labor intensive and therefore costly. As the piston is machined on a screw machine, excessive tolerances may be introduced into the dimensions of the parts.

SUMMARY OF THE INVENTION

The present invention provides for a safe and rugged pop-up pneumatic unit which is simple to manufacture, and less costly than the type described by the prior art. Tighter tolerances are also realized, resulting in a more precision apparatus.

According to the invention a pneumatic pop-up unit is provided having an open-topped cylinder housing and a piston slidably received therein. The piston accommodates a contact element in the form of a ball or plug at least partially extending above the open top of the piston. A seal attached to the outside surface of the wall of the piston about the circumference thereof, configured and arranged to form a substantially air-tight barrier with the inside surface of the side wall of the housing, wherein the bottom wall of the piston and the seal form a substantially air-tight volume with the bottom wall and side wall of the housing. A cap attached to the open top of the cylinder housing, the cap having a flange and a central opening having a descending guide channel sized to slidably receive the outside surface of the side wall of the piston, wherein the cap is secured about its circumference to the side wall of the housing at the open end thereof by a single-seam crimped, rolled, coined, spun, or swaged joint. Gas under pressure can be admitted to the sealed volume to elevate and suspend the piston such that the contact element is partially extended above the cap.

Features of the invention include a pneumatic pop-up unit having a piston composed of a multi-part construction of stamped, extruded or drawn metal, leading to more economic manufacture at closer tolerances resulting in a more precision product. Another feature of the invention is a cap that is joined to the cylinder housing by single-seam crimping, rolling, coining, spinning or swaging, creating a more secure and durable joint, leading to increased safety and longevity.

BRIEF DESCRIPTION OF THE DRAWINGS

The foregoing and other features and advantages of the present invention will be more fully understood from the following detailed description of an illustrative embodiment, taken in conjunction with the accompanying drawing in which:

FIG. 3 is a cutaway view of an exemplary embodiment of a pop-up plunger or pad according to the instant invention.

FIG. 4 is a partial cutaway view showing another configuration of the joint between the housing and the cap of an exemplary embodiment of the pneumatic pop-up unit according to the invention.

FIG. 5 is a partial cutaway view showing still another configuration of the joint between the housing and the cap of an exemplary embodiment of the pneumatic pop-up unit according to the invention.

DETAILED DESCRIPTION OF A PREFERRED EMBODIMENT

The present invention will be described herein with reference to an illustrative embodiment of a pop-up pneumatic unit. As will be described below, the invention is applicable to pop-up ball transfers, plunger pads or stops, which use balls or plugs as contact elements.

Figure 1:
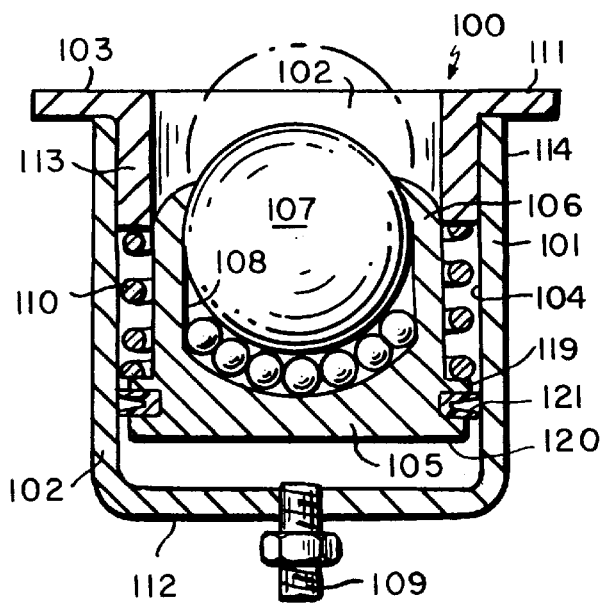
FIG. 1 is a cutaway view of a prior art ball transfer.
Figure 2:
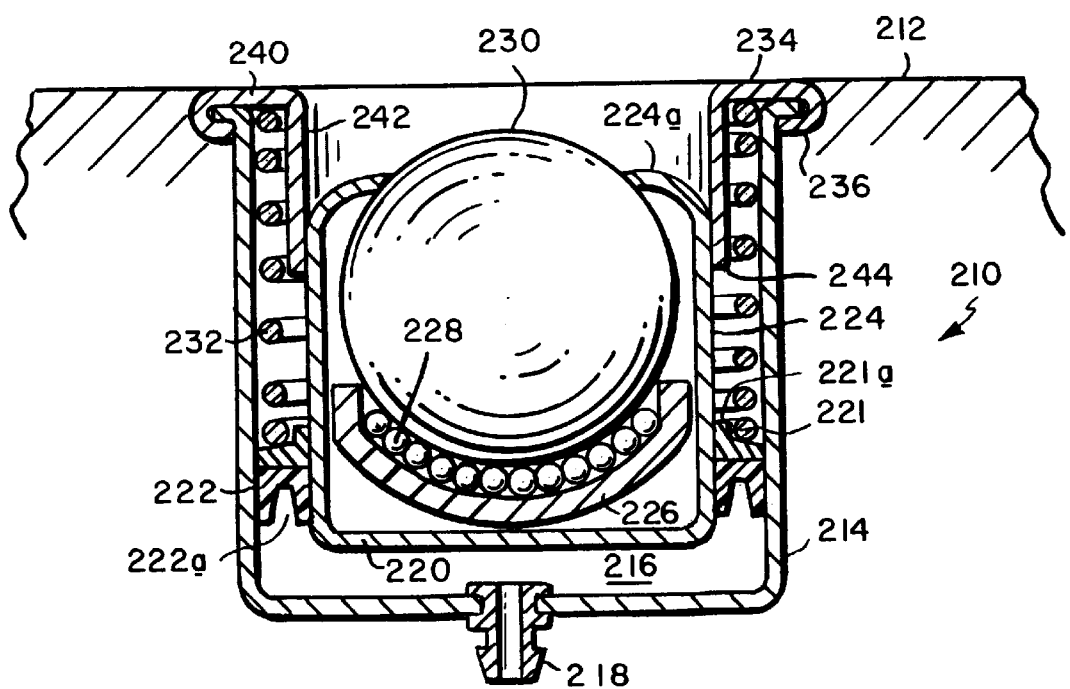
FIG. 2 is a cutaway view of an exemplary embodiment of the ball transfer according to the instant invention.

A single ball transfer unit 210 according to an illustrative embodiment of the instant invention is depicted in FIG. 2. In use this unit would be "ganged" with other ball transfer units arranged in an array. The ball transfer 210 is shown mounted in a bore drilled into a surface 212, such as a work surface or a strip, in the conventional manner. The flange of the transfer is shown mounted recessed with respect to the work surface 212, but it can also be mounted flush. A cylinder housing in the form of a cup 214 has a bottom wall and a side wall defining an interior volume 216. The cylinder housing 214 is formed with an open top. The volume 216 is in fluid communication with a brass nipple 218, which is connected to a controlled fluid supply via a line (not shown). The nipple advantageously is dimensioned to aid in the metering of gas therethrough, so as to provide smooth operation of the pop-up unit.

A piston 220, preferably formed of drawn or stamped metal, molded plastic, or the like is slidably received in the volume 216. The piston 220 has a bottom wall and a side wall defining an open top internal volume. A bearing ring 221 is preferably fixedly attached to the piston by press fitting, however other known means such as bonding, adhesives, and the like can also be used. A U-cup or block-V seal 222 is snugly fit over the piston 220 and abuts the bearing ring 221. The bearing ring supports the seal 222 and prevents it from sliding up the piston 220. The seal is preferably of the split design, which provides an annular channel 222a which when subjected to pressure in the volume 216, acts to urge the outer leg of the seal against the inner wall of the cylinder housing 214 and the inner leg of the seal against the outer wall of the piston 220, creating a more effective seal. The U-cup or block-V seal advantageously provides for smoother operation and less "breakaway" during operation than with other seals such as O-rings.

The wall 224 of the piston 220 defines a receiving space for a bowl-shaped race 226, which holds a plurality of secondary ball bearings 228. The race has a circumference extending substantially about the circumference of the internal volume of the piston. The concavity of the race faces the open end of the piston as shown. The secondary ball bearings in the race 226 support the primary ball 230, such that the primary ball 230 is freely rotatable. The top of the wall 224 is coined or rolled over at 224a to retain the primary ball 230 in the piston 220.

A cap 234, preferably made of drawn metal, is fit into the top of the cylinder 214, with a central opening and an inside surface 242 providing a descending guide channel for the wall 224 of the piston 220. The cap 234 is fixed to the top of the housing 214 by a single-seam crimped, rolled, coined, spun or swaged joint at 236 around the entire perimeter. A flange 240 of the cap 234 provides a smooth transition to the work surface 212.

A compression spring 232 is retained at an upper end thereof by the flange 240 and the descending wall 242, and at a lower end thereof by the stop 221a of the bearing ring 221 as depicted. The stop 221a of the bearing ring is preferably formed by extruding, but other known manufacturing processes can also be used. The spring biases the piston downwardly, such that the ball is in a retracted position. The bearing ring 221 helps to maintain the spring away from the piston 220 and the housing wall 232. The spring may also advantageously have a top turn of the coil inwardly or outwardly radially disposed to axially maintain the spring at the upper end engaging the flange 240.

In operation, air or other gas under pressure is introduced into the volume 216 via the nipple 218. A sealed volume is defined by the piston 220, the seal 222, and the cylinder housing 214. The pressure urges the piston 220 upward against the bias of spring 232, and extends into the annular groove 222a of the seal 222, increasing the efficiency of the seal. The primary ball 230 is thusly deployed above the cap 234. The piston 220 is limited in its upward travel when stop 221a abuts surface 244 of the cap 234. The pressure within the volume 216 suspends the piston 220 and the primary ball 230, as well as any load supported by the primary ball 230. The annular groove 222a of the seal 222 receives the full pressure of the volume 216, allowing the seal to more efficiently maintain the pressure in the volume 216, because the walls of the seal 222 are urged into sealing relationship with the wall of the cylinder housing 214.

FIG. 3 depicts a pop-up plunger or stop unit 211, where like elements are labeled with like numerals as FIG. 2. In place of a ball, bowl-shaped race, and ball bearings, a bumper 231 is supported by the piston 220. Such bumpers can be formed as a plug of any material, but the preferred material is a urethane or rubber exhibiting desirable anti-skid properties. The bumper, or pad, may advantageously be formed of electrostatic-dissipating material, for use with static-sensitive loads, such as electronics components. Such bumpers, when elevated with a load atop them, are useful for supporting loads in an anti-skid manner. The bumpers may be formed as molded plugs, and inserted into the piston 220, followed by the coining of the piston at 224a. Alternatively, the piston 220 may be pre-coined at 224a, and the plugs molded into the piston 220 by injection- or other molding processes, such as pouring. Alternatively, the piston may be formed as a can, with the bumper formed as a pad bonded or otherwise secured to the top of the cap. The can-shaped piston could, of course, comprise holes or other structures to engage cooperating structures located on the bumper, or to otherwise aid in the location and securing of the bumper to the piston. To facilitate injection molding, a hole may be drilled into the bottom of the piston, which will be subsequently sealed by the bumper material.

The single-seam crimped, rolled, coined, spun or swaged joint 236 of the instant invention advantageously provides a joint that cannot be separated by the pressures of ordinary operation, even after many cycles. Because the joint extends around the entire circumference of the housing and the cap, there is virtually no chance of separation. Compared to the prior art, where the cap was crimped in a discrete number of places, the increase in safety of operation is greatly enhanced.

Turning now to FIG. 4, another configuration of the joint 236 is depicted. The joint 236 results from the crimping, rolling, coining, spinning or swaging the cap 234 over the end 241a of the housing 214. In this example, both the housing wall end 214a and the cap 234 are deformed to form the joint. The flange 240 is defined on its upper surface by the cap 234.

FIG. 5 depicts still another configuration of the joint 236. In this example, the cap 234 is shaped to comprise a vertically offset annulus 234a. The housing wall 214 is then crimped, rolled, coined, spun or swaged about the annulus 214a to form the joint 236. The flange 240 is formed by the surface defined by the cap 234 transitioning to the portion of the housing wall 214a above the surface 212.

The instant invention also makes use of drawn metal components, which are less expensive per unit, and far easier to machine and more precise than the prior art unit, further contributing to cost savings. For example, the peaning or swedging of the top of the ball piston to retain the ball is relatively easy because of the thin walls of the drawn metal cup construction. Another major advantage is that the assembled product weighs far less than the prior art construction, reducing the cost of materials, shipping, and decreasing the added cost of structural support needed to suspend an array of the pop-up units, all the while increasing structural integrity.

In a preferred embodiment, the housing is a circular cylindrical cup having a diameter of about 1½", and a height of about 1¼". The cap, after being joined to the housing, has a flange diameter of about 1 55/64" and the bearing channel descends about 7/16" into the housing. The preferred ball in the ball transfer is a 1" diameter ball bearing. The ball bearing may be any suitable material, such as carbon steel, stainless steel, brass, plastic, etc. The piston in the preferred embodiment is a circular cylindrical cup having a diameter of about 1⅛" and a height of about 1", which accommodates a race therein. The preferred nipple has an orifice of about 0.040". The unit can, of course, be configured to virtually any size according to the intended use of the pop-up pneumatic unit.

Although the invention has been shown and described with respect to exemplary embodiments thereof, various other changes, additions and omissions in the form and detail thereof may be made therein without departing from the spirit and scope of the invention. For example, although the present invention is described as having a substantially circular cylindrical configuration, other cross sectional configurations are possible. Further, although the cylinder, piston and cap of the unit have been described as being fabricated of metal, other materials exhibiting ductility or castability enabling rolling, stamping or drawing, crimping, coining, and/or molding may be employed. While a U-cup or block-V seal has been described herein, other seals known in the art, such as O-rings, may also be used. Further, while the U-cup or block-V seal as described herein utilizes a single bearing ring 221, a second bearing ring underneath the seal may be used.

What is claimed is:

1. A pneumatic pop-up unit comprising:

a cylinder housing having a bottom wall and a side wall defining an internal volume having an open top;

the side wall extending upwards from the bottom wall and extending outwards away from the internal volume to form a cylinder housing top wall;

a piston slidably received in said housing, said piston having a bottom wall and a side wall defining an internal volume and having an open top;

a contact element held within the internal volume of the piston and at least partially extending above the open top of the piston;

a seal attached to the outside surface of the wall of the piston about the circumference thereof, configured and arranged to form a substantially air-tight barrier with the inside surface of the side wall of the cylinder housing, wherein the bottom wall of the piston, and the seal form a substantially air-tight volume with the bottom wall and side wall of the cylinder housing;

a cap attached to the open top of the housing, the cap having a flange and a central opening having a descending guide channel sized to slidably receive the outside surface of the side wall of the piston, wherein the cap extends outwards along the length of the top wall and then extends downwards and inwards along the top wall towards the side wall and wherein the cap is secured about its circumference to the top wall of the housing by a single-seam crimped, rolled, coined, spun or swaged joint;

a compression spring for biasing the piston toward the bottom of the cylinder housing; wherein gas under pressure can be admitted to the sealed volume to elevate and suspend the piston against the bias of the spring such that the contact element is partially extended above the cap.

2. The pneumatic pop-up unit of claim 1, wherein the contact element is a ball.

3. The pneumatic pop-up unit of claim 2, wherein:

the internal volume of the piston accommodates a bowl-shaped race with a circumference extending substantially about the circumference of the internal volume of the piston, the race having a concavity facing toward the open top of the piston;

a plurality of secondary ball bearings held within the concavity of the bowl-shaped race;

a primary ball abutting the ball bearings, such that the ball extends above the open top of the piston and wherein the piston is constructed and arranged to hold the ball within the internal volume of the piston.

4. The pneumatic pop-up unit of claim 3, wherein the side wall of the piston is coined or rolled at the open end of the piston to retain the ball in the internal volume of the piston.

5. The pneumatic pop-up unit of claim 1, wherein the contact element is a friction element.

6. The pneumatic pop-up unit of claim 5, wherein the friction element is formed of an elastomeric material.

7. The pneumatic pop-up unit of claim 1, further comprising a bearing ring mounted to the outside of the side wall of the piston, forming a bearing surface for the seal.

8. The pneumatic pop-up unit of claim 7, wherein the spring is maintained by the descending guide channel and the bearing ring.

9. The pneumatic pop-up unit of claim 7, wherein the bearing ring cooperates with the bottom of the descending guide channel to limit the upward travel of the piston.

10. The pneumatic pop-up unit of claim 1, wherein the seal is a split elastomeric seal, having an annular groove in communication with the sealed volume.

11. The pneumatic pop-up unit of claim 10, wherein the seal is a U-cup or block-V seal.

12. The pneumatic pop-up unit of claim 10, wherein the seal is an O-ring seal.

13. The pneumatic pop-up unit of claim 1, wherein the housing and the piston are formed of drawn metal.

* * * * *